United States Patent [19]
Rennar

[11] Patent Number: 5,859,115
[45] Date of Patent: Jan. 12, 1999

[54] TIRE TREAD RUBBER MIXTURE FOR PNEUMATIC VEHICLE TIRES

[75] Inventor: Nikolaus Rennar, Unterpleichfeld, Germany

[73] Assignee: Continental Aktiengesellschaft, Hanover, Germany

[21] Appl. No.: 630,934

[22] Filed: Apr. 5, 1996

[30] Foreign Application Priority Data

Apr. 6, 1995 [DE] Germany ............... 195 12 543.6

[51] Int. Cl.⁶ .................. C08L 9/00; C08L 25/08
[52] U.S. Cl. ............ 524/492; 524/495; 524/496; 524/526; 524/540; 524/541; 524/542; 152/450
[58] Field of Search ................. 524/492, 495, 524/496, 526, 540, 541, 542; 152/450

[56] References Cited

U.S. PATENT DOCUMENTS

| | | | |
|---|---|---|---|
| 3,962,156 | 6/1976 | Harrop | 525/133 |
| 5,019,617 | 5/1991 | Kaidoo et al. | 524/346 |
| 5,225,479 | 7/1993 | Jenyek et al. | 524/526 |
| 5,336,730 | 8/1994 | Sandstrom et al. | 525/332.6 |

FOREIGN PATENT DOCUMENTS

| | | |
|---|---|---|
| 0447066 | 9/1991 | European Pat. Off. . |
| 0501227 | 9/1992 | European Pat. Off. . |
| 0537640 | 4/1993 | European Pat. Off. . |
| 0644235 | 3/1995 | European Pat. Off. . |
| 2062883 | 6/1972 | Germany . |
| 2457446 | 6/1976 | Germany . |

OTHER PUBLICATIONS

Derwent Abstract JP 4318044, Nov. 9, 1992.

*Primary Examiner*—Mark L. Warzel
*Attorney, Agent, or Firm*—Robert W. Becker & Associates

[57] ABSTRACT

A sulfur-vulcanizable rubber mixture for a tire tread includes at least one terpolymer with a conjugated diene, an aromatic vinyl compound, and a monoolefin monomer. At least one phenolic component selected from the group consisting of a phenolic resin and a precursor mixture, containing phenol and aldehyde, for a phenolic resin is also present. A reinforcing agent in the form of finely divided silica or a mixture of finely divided silica and carbon black is also added.

14 Claims, No Drawings

TIRE TREAD RUBBER MIXTURE FOR PNEUMATIC VEHICLE TIRES

BACKGROUND OF THE INVENTION

The present invention relates to a rubber mixture for tire treads vulcanizable with sulfur, a method for its manufacture as well as a tire comprising a tire tread made of the vulcanized rubber mixture.

The service life of a tire tread depends on its composition. In cases in which a reduced rolling resistance together with improved grip on wet road surfaces is required, a rubber mixture is conventionally used for the tire tread that comprises a polymerized styrene butadiene rubber (SBR) polymerized in an organic solvent in combination with at least one further diene elastomer and finely divided precipitated silica as a reinforcing agent. The silica is used either alone or in combination with carbon black. Furthermore, the compositions for tire treads conventionally comprise mineral oil as a plasticizer. The vulcanization is carried out in the presence of sulfur and vulcanization control agents.

Due to the fact that the polar surface of the silica, in contrast to the surface of carbon black, is of reduced activity relative to rubber, it is necessary to treat the silica with relatively expensive silane coupling agents in order to ensure bonding of the silica surface to the rubber. This treatment is, in general, performed such that the silane coupling agent together with silica is added during the mixing process to the rubber. Conventionally, this mixing method requires exactly controlled mixing conditions due to the different reactivity of the different functional groups in most of the reinforcing agents with, in most cases, additional processing steps.

Furthermore, the grip on wet or moist street surfaces of tire tread rubber mixtures that contain silica in combination with a SBR rubber mixture is, in general, worse than conventional carbon black filled tire rubber mixtures. This is especially apparent in connection with vehicles that do not have anti-lock brakes.

The wear resistance of silica-filled SBR rubber systems is also reduced with respect to conventional rubber mixtures.

It is therefore an object of the present invention to provide a rubber mixture vulcanized with sulfur that is suitable for tire treads of pneumatic vehicle tires. Such tires containing the aforementioned tire treads should provide an improved sliding and rolling resistance without the aforementioned disadvantages. Especially, it is desired not to decrease wear resistance and steering precision. Furthermore, the tire manufacture, due to the use of inexpensive raw materials and reduced mixing expenditures, should be less expensive than with the aforementioned prior art rubber mixtures.

SUMMARY OF THE INVENTION

A sulfur-vulcanizable rubber mixture for a tire tread according to the present invention is primarily characterized by:
   at least one terpolymer comprising a conjugated diene, an aromatic vinyl compound, and a monoolefin monomer;
   at least one phenolic component selected from the group consisting of a phenolic resin and a precursor mixture, containing phenol and aldehyde, for a phenolic resin; and
   a reinforcing agent selected from the group consisting of finely divided silica and a finely divided silica/carbon black mixture.

Advantageously, the rubber further comprises at least one diene elastomer.

Preferably, the rubber mixture contains 40–100 parts by weight of the reinforcing agent for 100 parts by weight of a mixture of the at least one terpolymer and the at least one diene elastomer.

Advantageously, the diene elastomer is selected from the group consisting of natural rubber, synthetic polyisoprene, polybutadiene, and isoprene-butadiene copolymer.

The rubber mixture preferably further comprises at least one copolymer of a conjugated diene and an aromatic vinyl compound.

In a preferred embodiment of the present invention the rubber mixture contains 40–100 parts by weight of the reinforcing agent for 100 parts by weight of a mixture of the least one terpolymer and the at least one copolymer.

Expediently, the rubber mixture further comprises at least one diene elastomer.

In this embodiment the rubber mixture preferably contains 40–100 parts by weight of the reinforcing agent for 100 parts by weight of a mixture of the at least one terpolymer, the at least one copolymer, and the at least one diene elastomer.

Advantageously, the diene elastomer is selected from the group consisting of natural rubber, synthetic polyisoprene, polybutadiene, and isoprene-butadiene copolymer.

Preferably, the copolymer of the conjugated diene and an aromatic vinyl compound is styrene-butadiene copolymer.

Expediently, the conjugated diene of the terpolymer is selected from the group consisting of 1,3-butadiene, isoprene, 2,3-dimethyl-1,3-butadiene, chloroprene, 1,3-pentadiene, hexadiene, and mixtures of any of the above. Expediently, the aromatic vinyl compound is selected from the group consisting of styrene, α-methylstyrene, p-methylstyrene, o-methystyrene, p-butylstryrene, vinyinaphtahlene and mixtures thereof. The monoolefin monomer is preferably selected from the group consisting of acrylonitrile, methacrylonitrile, and a mixture of acrylonitrile and methacrylonitrile.

Advantageously, the phenolic resin is a polycondensate resulting from a reaction of at least one phenolic compound with at least one aldehyde.

Advantageously, the silica has a BET surface area of 40 $m^2/g$ to 350 $m^2/g$, a CTAB surface area of 50 $m^2/g$ to 350 $m^2/g$, an average particle diameter of 10 nm–150 nm, and a DBP number of 50–350 ml per 100 g.

Preferably, the carbon black has a DBPA adsorption of 30–180 $cm^3$ per 100 g in accordance with ASTM D 2414, an iodine adsorption number of 10–250 g per kg in accordance with ASTM D 1510, and a CTAB number or 5–150 $m^2/g$ in accordance with ASTM D 3765.

Advantagously, the rubber mixture contains 40–100 parts by weight of the reinforcing agent for 100 part by weight for the at least one terpolymer.

Preferably, the silica/carbon black mixture contains silica and carbon black in a ratio of 1:4 to 5:1.

Expediently, the silica has a surface modified with a silane coupling agent.

The silica is preferably modified by reacting 0.2–30 parts by weight of the silane coupling agent with 100 parts by weight of silica.

The silica may be modified during mixing of the rubber mixture or prior to mixing of the rubber mixture.

The rubber mixture expediently further comprises rubber compounding additives.

The present invention also relates to a method for producing a rubber mixture that comprises the following steps:
   Mixing at a temperature of 110°–150° C. a) at least one terpolymer comprising a conjugated diene, an arromatic vinyl compound, and a monoolefin monomer, b) at least one phenolic component selected from the group consisting of a phenolic resin and a precursor mixture, containing phenol and aldehyde, for a phenolic resin, and c) a reinforcing agent selected from the group consisting of finely divided silica and a finely divided silica/carbon black mixture; and admixing a vulcanization system at a temperature below vulcanization temperature.

Preferably, the step of mixing includes adding at least one diene elastomer.

The present invention also relates to a tire comprising a tread strip consisting of a sulfur-vulcanized rubber mixture comprising a) at least one terpolymer comprising a conjugated diene, an aromatic vinyl compound, and monoolefin monomer, b) at least one phenolic component selected from the group consisting of a phenolic resin and a precursor mixture, containing phenol and aldehyde, for a phenolic resin, and c) a reinforcing agent selected from the group consisting of finely divided silica and a finely divided silica/carbon black mixture.

According to the present invention the sulfur-vulcanizable rubber mixture for tire treads comprises:

(a) at least one terpolymer comprised of conjugated diene, an aromatic vinyl compound, and a monoolefin monomer;

(b) optionally at least one diene elastomer and/or at least one copolymer of a conjugated diene and an aromatic vinyl compound;

(c) at least one phenolic resin and/or its phenol and aldehyde precursor compounds;

(d) finely divided precipitated silica or a combination of finely divided, precipitated silica and carbon black as a reinforcing agent as well as (e) optionally further conventional rubber compounding additives.

The conjugated diene inventively used in the terpolymer is selected from 1,3-butadiene, isoprene, 2,3-dimethyl-1,3-butadiene, chloroprene, 1,3-pentadiene, hexadiene or mixtures thereof. The aromatic vinyl compound is selected from styrene, α-methylstyrene, p-methylstyrene, o-methylstyrene, p-butylstyrene, vinylnaphthalene or mixtures of any of the above. The monoolefin monomer is selected from acrylonitrile, methacrylonitrile or mixtures thereof. Preferably, the terpolymer is comprised of butadiene, styrene and acrylonitrile.

The conjugated diene is present in an amount of 85–30 weight-%, preferably 85–40 weight %, the aromatic vinyl compound is present in an amount of 10–40 weight-%, and the monoolefin monomer is present in an amount of 5–30 weight-%, preferably 5–20 weight-%, relative to the terpolymer.

The terpolymer has a glass transition temperature in the temperature interval of 0° C. to minus 60° C., preferably in the interval of minus 5° C. to minus 50° C. The glass transition temperature can be adjusted via the amount of aromatic vinyl component as well as via the contents of monoolefin component within the terpolymer over a wide temperature range so that the properties of the rubber mixture can be optimized in the desired direction.

Terpolymers according to the present invention can be produced according to well-known polymerization methods. In this context reference is made to well known literature references, for example:

H. -G. Elias: "Makromoleküle", Vol. 1, 5th edition, pages 512–550, Huthig & Wepf, Basel, Heidelberg, N.Y., 1990;

F. Lohse in: H. Batzer, Ed., "Polymere Werkstoffe", Vol. 1, pages 33–136, Georg Thieme Verlag, Stuftgart, N.Y., 1985.

The polymerization of the inventive terpolymers is preferably performed by emulsion polymerization.

The inventive rubber mixture may further comprise up to 90 weight-%, preferably up to 30 weight-%, relative to the combined elastomer contents ((a)+(b)) of at least one diene elastomer and/or one copolymer of conjugated diene and an aromatic vinyl compound, selected from natural rubber, synthetic polyisoprene, and polybutadiene or copolymers of isoprene and butadiene, respectively, copolymers of styrene and butadiene.

The phenolic resin is used instead of the otherwise conventionally used expensive silanization agents for coupling the active silica to the rubber matrix. This results in an especially favorable compatibility and synergism between the polar phenolic resins, the terpolymer, and silica.

The phenolic resins are polycondensates which are produced from one or more phenolic compounds and one or more aldehydes. The inventively used phenolic compounds are selected from unsubstituted phenol, resorcin as well as alkylphenols substituted in the p-position by large alkyl groups (C4 to C12) and phenolic resins modified by natural resins or mixtures of any of the above. The inventively used aldehydes are selected from formaldehyde, butyraldehyde, benzaldehyde, salicylaldehyde, acrolein, crotonealdehyde, acetaldehyde or mixtures of any of the above.

The preferred aldehyde is formaldehyde.

The phenolic resins of the present invention are characterized by the presence of functional hydroxyl groups. They have a hydroxyl number of >500 mg KOH per gram of phenolic resin (DIN 53 240) and softening points between 90° C. and 120° C. (DIN 53 460) and may optionally contain double bonds which results in good compatablility with the rubber matrix as well as with the active silica so that an optimal reinforcement and compatablility can be achieved.

In the alternative, or in addition to the phenolic resins, it also possible to use the precursor mixture comprised of a phenol compound and an aldehyde compound which leads to the same result.

The proportion of phenolic resin is 0.5 to 20 parts by weight, preferably 2–10 parts by weight, relative to 100 parts by weight of elastomer ((a)+(b)).

According to the invention, any finely divided (precipitated) silica that is conventionally employed for the manufacture of rubber mixtures and is well known to a person skilled in the art can be used. In this context special reference is made to silicas disclosed in European patent application 0 501 227, European patent application 0 157 703, and German patent application 2 410 014.

In general, it is thus possible to use precipitated finely divided silica as a reinforcing agent in the inventive composition which has a BET surface area of 40–350 m$^2$/g, especially of 100 to 250 m$^2$/g, a CTAB surface area of 50–350 m$^2$/g, preferably of 100–250 m$^2$/g, and an average particle diameter of 10–150 nm, preferably 10–100 nm, and a DBP adsorption of 50–350 ml/100 g, preferably 150–250 ml/100 g. The silica can be used alone or in combination with carbon black.

The surface of the aforementioned silica can additionally be treated with silane coupling agents (organosilanes) of the following formulas I to III

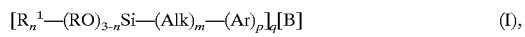

in which:

B: —SCN, —SH, —Cl, —NH$_2$ (when q=1) or —S$_x$ (when q=2),

R and R¹: an alkyl group with 1 through 4 carbon atoms, phenyl, whereby all substituents R and R¹ may be identical or different;

n: 0, 1, 2 or 3,

Alk: a divalent linear or branched hydrocarbon substituent with 1 to 6 carbon atoms:

m: 0 or 1;

Ar: and aryl substituent with 6 to 12 carbon atoms, preferably 6 carbon atoms;

p: 0 or 1 with the condition that p and n not be 0 simultaneously;

x: a number from 2 to 8;

Alkyl: a monovalent linear or branched saturated hydrocarbon substituent with 1 to 20 carbon atoms, preferably 2 to 8 carbon atoms; and Alkenyl: a monovalent linear or branched unsaturated hydrocarbon substituent with 2–20 carbon atoms, preferably 2 to 8 carbon atoms.

In connection with organosilanes, their manufacture and combination with silica the following references are provided:

S. Wolff: "Reinforcing and Vulcanization Effects of Silane Si 69 inSilica-Filled Compounds" Kautschuk+Gummi, Kunststoffe 34, 280–284 (1981);

S. Wolff: "Silanes in Tire Compounding After Ten Years—Review", lecture presented at Third Annual Meeting and Conference on Tire Science and Technology, The Tire Society, 28–29 Mar. 1984, Akron, Ohio, USA;

S. Wolff: "Optimization of Silane-Silica OTR Compounds. Part 1: Variations of Mixing Temperature and and Time during the Modification of Silica with Bis (3-triethoxysilylpropyl)-tetrasulfide", Rubber Chem. Technol. 55, 967–989 (1982);

S. Wolff, R. Panenka: "Present Possibilities to Reduce Heat Generation of Tire Compounds", lecture presented at International Rubber Conference IRC'85 in Kyoto, Japan;

S. Wolff, R. Panenka, E. H. Tan: "Reduction of Heat Generation in Truck Tire Tread and Subtread Copounds", lecture presented at International Conference on Rubber and Rubber-like Materials, Jamshedpur, India, 6–8 Nov. 1986;

S. Wolff: "The Influence of Fillers on Rolling Resistance", lecture presented at a meeting of Rubber Division, American Chemical Society, New York/NJ, USA, 8–11 Apr. 1986.

The inventively employed silane coupling agents for pretreating the silica are known to a person skilled in the art, for example, from European patent application 0 447 066, German patent application 2 062 883 or German patent application 2 457 446. Preferred in the context of the present invention are silane coupling agents having at least one alkoxy group within the molecule. Such silanes are selected from bis(3-triethoxysilylpropyl) tetrasulfide, bis(2-triethoxysilylethyl) tetrasulfide, bis(3-trimethoxysilylpropyl) tetrasulfide, bis(2-trimethoxysilylethyl) tetrasulfide, 2-mercaptoethyltriethoxysilane, 3-mercaptopropyl-triethoxysilane, 2-mercaptoethyltrimethoxysilane, 2-mercaptoethyltriethoxysilane, 3-nitropropyltrimethoxysilane, 3-nitropropyl-triethoxysilane, 3-chloropropyltrimethoxysilane, 3-chloropropyltriethoxysilane, 2-chloroethyltrimethoxysilane, 2-chloroethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-diemthyl-thiocarbamoyl tetrasufide, 3-trimethoxysily-propylbenzothiazol tetrasulfide, 3-triethoxysilyl-propylbenzothiazolte trasulfide, 3-triethoxysilyl-propylmethacrylate monosulfide and 3-trimethoxysilypropyl methacrylate monosulfide. Preferred among these are bis(3-triethoxysilylpropyl) tetrasulfide and 3-trimethoxysilypropyl-benzothiazol tetrasulfide. It is possible to also use the following silanes as silane coupling agents: bis(3-diethoxymethylsilylpropyl) tetrasulfide, 3-mercaptopropyldimethoxymethylsilane, 3-nitropropyldimethoxymethylsilane, 3-chloropropyidimethoxymethylsilane, dimethoxymethylsilylpropyl-N,N-dimethylthiocarbamoyl tetrasulfide, dimethoxymethylsilylpropylbenzothiazol tetrasulfide, 3-thiocyanatopropyltriethoxysilane, 3-thiocyanatopropyltrimethoxysilane, trimethoxyvinylsilane, triethoxyvinylsilane.

The silane coupling agents are used in an amount of 0.2 to 3 parts by weight, preferably 0.5 to 15 parts by weight relative to 100 parts by weight of silica. The reaction between the silica and the silane coupling agent can be performed during the manufacture of the rubber mixture (in situ) or in the alternative, prior thereto. The latter results in a pretreated (modified) silica that as such can be added to the rubber mixture.

The ratio of volumes of silica to carbon black, when used in combination, is 1:4 to 5:1, preferably 1:2 to 3:1.

According to the invention it is possible to use any suitable carbon black as a reinforcing filler. Preferably, the carbon black has the following properties: a dibutylphthalate adsorption (DBPA-number) of 30 to 180 cm$^3$/100g (ASTM D 2414), an iodine adsorption number of 10 to 250g/kg (ASTM D 1510) as well as a CTAB-number of 5 to 150 m$^2$/g (ASTM D 3765).

The inventive rubber mixture contains the reinforcing filler material in an amount of 40–100 parts by weight, preferably 40–70 parts by weight, relative to 100 parts by weight of the rubber materials ((a) and (b)).

The diene elastomer, respectively, the copolymers can be produced from the basic monomers according to methods known to person skilled in the art in the presence of transition metal catalysts and especially such catalysts that contain cobalt, titanium, nickel, or neodymium.

The rubber mixture may further contain conventional rubber compounding additives in conventional amounts, for example, plasticizers (for example, mineral oil), antidegradents, sulfur, vulcanization accelerartors (for example, sulfenamide, thiazole, guanidine), inorganic pigments, further fillers but different from the aforementioned ones, activators (for example, stearic acid, zinc oxide), and wax.

The invention further relates to a method for manufacturing the above described sulfur-vulcanizable rubber mixture by:

1) mixing at least one terpolymer of a conjugated diene, an aromatic vinyl compound, a further monoolefin monomer and optionally at least one diene elastomer and/or at least one copolymer of a conjugated diene and an aromatic vinyl compound as a further polymer with a filling material comprised of finely divided precipitated silica or finely divided precipitated silica in combination with carbon black, at least one phenolic resin and/or its phenol and aldehyde precursor compounds as well as the conventionally used additives with the exception of the vulcanization system by simultaneously heating the composition to a temperature between 110° and 150° C., and 2) Admixing the vulcanization system below the vulcanization temperature.

With respect to the type and ratio of the conjugated diene, the aromatic vinyl component, the monoolefin monomers, the further diene elastomer, respectively, copolymers, the fillers such as silica and optionally carbon black, phenol resin, the conventional additives, the vulcanization system, and optionally an additional silane coupling agent, reference is made to the above disclosure.

The mixing steps and the vulcanization can be carried out in apparatus known to a person skilled in the art (for example, in kneading devices). In a first step of mixing, the temperature should be at least 110° C.

The method with respect to the mixing step can also be performed such that the mixture is first heated to the desired temperature and is then again cooled to a temperature below the vulcanization temperature. This cycle must be preformed at least once.

The inventive rubber mixture can be used for tire treads in the manufacture of pneumatic vehicle tires under well-known conditions after vulcanization in the presense of a suitable vulcanization system. The inventively vulcanized rubber mixture can also be used in conveyor belts, seals, gaskets, V-belts, hoses and shoe soles.

The present invention further relates to tires which comprise tire treads that are comprised of the afored described vulcanized inventive rubber mixture.

Tires which have tire treads comprised of the inventive vulcanized rubber mixture exhibit especially advantageous properties as, for example, an excellent sliding and rolling resistance with acceptable wear resistance. It should be mentioned especially that the ratio of sliding, rolling, and wear resistance is especially balanced.

Co—BR

Commercial "Buna CB 10" of Bayer AG, Germany (cobalt-polybutadiene with a cis-1,4-ratio of approximately 96 weight-%)

SBR 1712:

Commercial product "Buna EM 1712" of HÜls AG, Germany (emulsion SBR with a contents of polymerized styrene of approximately 23.5 weight-%, oil extended with 37.5 weight-% aromatic mineral oil)

Carbon black N339 (ASTM D 1765):

Commercial product "Corax N 339" of Degussa, Germany (manufactured according to the furnace method)

Silica VN3, VN2:

Commercial products "Ultrasil VN3", "Ultrasil VN2" of Degussa, Germany (manufactured according to precipitation methods)

Activator X 50 S:

Commercial product of Degussa, Germany (mixture of reinforcing additive "Si 69" with "Corax N 330" in weight ratio of 1:1)

aromatic mineral oil:

Commercial product "Enerdex 65" of BP

Zinc oxide

Commercial product "Zinkweiß-Rostsiegel Grillo" of Grillo Zinkoxide GmbH, Germany

TABLE 1

Formulation (in phr)

| Component | Reference | A | B | C | D | E | F | G |
|---|---|---|---|---|---|---|---|---|
| Natural rubber (NR) | — | 10 | 10 | 10 | — | — | — | 10 |
| Co-BR | — | — | — | — | 20 | 10 | 10 | — |
| Teropolymer | — | 90 | 90 | 90 | 80 | 90 | 90 | 90 |
| SBR 1712 | 137.5 | — | — | — | — | — | — | — |
| Carbon Black N 339 | 80 | 40 | 20 | 20 | 20 | 10 | 10 | 10 |
| Silica VN 3 | — | 20 | 40 | — | 40 | — | — | 40 |
| Silica VN 2 | — | — | — | 40 | — | 40 | 40 | — |
| Activator X 50 S | — | — | — | — | — | — | 2 | 7.0 |
| Phenolic resin[3] | — | 3 | 3 | 3 | 3 | 2 | 3 | 0.6 |
| Phenolic Compound[4] | — | — | — | — | — | 1.5 | — | — |
| Aldehyde Compound[5] | — | — | — | — | — | 1.5 | — | — |
| Arom. mineral oil | 2.5 | 12 | 12 | 12 | 12 | 8 | 8 | 10 |
| Antidegradent | 2 | 2 | 2 | 2 | 2 | 2 | 2 | 2 |
| Antioxidant Wax | 1 | 1 | 1 | 1 | 1 | 1 | 1 | 1 |
| Stearic acid | 2 | 2.5 | 2.5 | 2.5 | 2.5 | 2.5 | 2.5 | 2 |
| Zinc Oxide | 3 | 3 | 3 | 3 | 3 | 3 | 3 | 3 |
| Sulfur | 1.8 | 1.4 | 1.5 | 1.5 | 1.5 | 1.5 | 1.5 | 1.6 |
| Accelerator CBS[1] | 1.8 | 1.4 | 1.5 | 1.5 | 1.5 | 1.5 | 1.5 | 1.6 |
| Accelerator DPG[2] | 0.3 | 0.9 | 1 | 1 | 1 | 0.5 | 1 | 1.0 |

[1] N-cyclohexyl-2-benzothiazolsulfenamide;
[2] N,N'-diphenylgaunidin;
[3] formaldehyde phenolic resin
[4] resorcin;
[5] hexamethoxymethylmelamine (formaldehyde precursor)

DESCRIPTION OF PREFERRED EMBODIMENTS

The object and advantages of the present invention will appear more clearly from the following specification in conjunction with the accompanying Tables 1 and 2.

EXAMPLES

Raw materials used for the manufacture of the inventive rubber mixtures:

With the vulcanized rubber products produced according to the data provided in Table 1, the following data have been measured (compiled in Table 2).

Since the determination of rubber wear according to DIN 53 516 does not actually convey information with respect to the wear behavior of elastomers in practice, for a determining of the street wear behavior the determination of mechanical ultimate vulcanization properties at different temperatures was used.

Hardness testing (Shore A): DIN 53 305

Rebound resilience: DIN 53 512

Tensile strength: DIN 53 504

Elongation tear: DIN 53 504

Tensile stress at a given elongation (100%, 300%): DIN 53 504

Tan δ at 60° C., 10HZ, ±2% dyn

Deformation, pull-push deformation measured with dynamic mechanical analyzer (Eplexor): DIN 53 513, DIN 53 535.

The present invention is, of course, in no way restricted to the specific disclosure of the specification, but also encompasses any modifications within the scope of the appended claims.

TABLE 2

Rubber Technological Test Results of the Formulations

|  | Reference | A | B | C | D | E | F | G |
|---|---|---|---|---|---|---|---|---|
| Shore Hardness (20° C.) [ShA] | 62 | 68 | 67 | 65 | 65 | 60 | 64 | 65 |
| Tensile Stress 100% (20° C.) [MPa] | 2.2 | 2.5 | 2.1 | 1.9 | 1.8 | 1.4 | 2.1 | 2.6 |
| Tensile Stress 300% (20° C.) [MPa] | 12.4 | 9.3 | 6.6 | 6.8 | 6.1 | 4.9 | 7.9 | 10.1 |
| Tenacity (20° C.) [MPa] | 20 | 20 | 15.9 | 17.6 | 18.2 | 16.8 | 19.8 | 18.8 |
| Elongation at tear (20° C.) [%] | 489 | 605 | 621 | 628 | 716 | 708 | 632 | 523 |
| Tenacity (80° C.) [MPa] | 9.9 | 9.3 | 7.2 | 7.0 | 7.9 | 8.0 | 7.4 | 7.3 |
| Elongation at tear (80° C.) [%] | 363 | 509 | 578 | 516 | 518 | 550 | 374 | 307 |
| Impact resilience (20° C.) [%] | 29 | 19 | 21 | 20 | 23 | 23 | 24 | 23 |
| RUWI - Index*) | 100 | 107 | 111 | 114 | 106 | 113 | 111 | 108 |
| tan δ (60° C., 10 Hz) | 0.232 | 0.256 | 0.228 | 0.225 | 0.229 | 0.200 | 0.178 | 0.147 |

*)improvement: values > 100

What I claim is:

1. A sulfur-vulcanizable tire tread rubber mixture comprising:
   a) at least one terpolymer comprising a conjugated diene, an aromatic vinyl compound, and a monoolefin monomer;
   b) up to 90 weight-% relative to a combined elastomer contents a)+b) of at least one elastomer selected from the group consisting of a diene elastomer and a copolymer of a conjugated diene and an aromatic vinyl compound;
   c) 0.5 to 20 parts by weight relative to 100 parts by weight of the combined elastomer contents a)+b) of at least one phenolic component selected from the group consisting of a phenolic resin and a precursor mixture, wherein said precursor mixture consists of at least one phenol and at least one aldehyde and wherein said phenolic resin is prepared by polycondensation from said precursor mixture; and
   d) 40 to 100 parts by weight relative to 100 parts by weight of the combined elastomer contents a)+b) of a reinforcing agent selected from the group consisting of finely divided silica and a finely divided silica/carbon black mixture.

2. A rubber mixture according to claim 1, wherein said diene elastomer is selected from the group consisting of natural rubber, synthetic polyisoprene, polybutadiene, and isoprene-butadiene copolymer.

3. A rubber mixture according to claim 1, wherein said copolymer of a conjugated diene and an aromatic vinyl compound is styrene-butadiene copolymer.

4. A rubber mixture according to claim 1, wherein:
   said conjugated diene of said terpolymer is selected from the group consisting of 1,3-butadiene, isoprene, 2,3-dimethyl-1,3-butadiene, chloroprene, 1,3-pentadiene, hexadiene, and mixtures thereof;
   said aromatic vinyl compound is selected from the group consisting of styrene, α-methylstyrene, p-methylstyrene, o-methylstyrene, p-butylstyrene, vinylnaphthalene, and mixtures thereof; and
   said monoolefin monomer is selected from the group consisting of acrylonitrile, methacrylonitrile, and a mixture of acrylonitrile and methacrylonitrile.

5. A rubber mixture according to claim 1, wherein said silica has a BET surface area of 40 $m^2/g$ to 350 $m^2/g$, a CTAB surface area of 50 $m^2/g$ to 350 $m^2/g$, an average particle diameter of 10 nm to 150 nm, and a DBP number of 50–350 ml/100 g.

6. A rubber mixture according to claim 1, wherein said carbon black has a DBPA adsorption of 30 to 180 $cm^3/100$ g in accordance with ASTM D 2414, an iodine adsorption number of 10 to 250 g/kg in accordance with ASTM D 1510, and a CTAB number of 5 to 150 $m^2/g$ in accordance with ASTM D 3765.

7. A rubber mixture according to claim 1, wherein said silica/carbon black mixture contains silica and carbon black in a ratio of 1:4 to 5:1.

8. A rubber mixture according to claim 1, wherein said silica has a surface modified with a silane coupling agent.

9. A rubber mixture according to claim 8, wherein said silica is modified by reacting 0.2 to 30 parts by weight of silane coupling agent with 100 parts by weight silica.

10. A rubber mixture according to claim 9, wherein said silica is modified during mixing of said rubber mixture.

11. A rubber mixture according to claim 9, wherein said silica is modified prior to mixing of said rubber mixture.

12. A rubber mixture according to claim 1, further comprising rubber compounding additives.

13. A method for producing a tire tread rubber mixture, said method comprising the steps of:

mixing at a temperature of 110° to 150° C.

a) at least one terpolymer comprising a conjugated diene, an aromatic vinyl compound, and a monoolefin monomer;

b) up to 90 weight-% relative to a combined elastomer contents a)+b) of at least one elastomer selected from the group consisting of a diene elastomer and a copolymer of a conjugated diene and an aromatic vinyl compound;

c) 0.5 to 20 parts by weight relative to 100 parts by weight of the combined elastomer contents a)+b) of at least one phenolic component selected from the group consisting of a phenolic resin and a precursor mixture, wherein the precursor mixture consists of at least one phenol and at least one aldehyde and wherein the phenolic resin is prepared by polycondensation from the precursor mixture; and d) 40 to 100 parts by weight relative to 100 parts by weight of the combined elastomer contents a)+b) of a reinforcing agent selected from the group consisting of finely divided silica and a finely divided silica/carbon black mixture; and admixing a vulcanization system at a temperature below vulcanization temperature.

14. A tire comprising a tread strip consisting of a sulfur-vulcanized rubber mixture comprising:

a) at least one terpolymer comprising a conjugated diene, an aromatic vinyl compound, and a monoolefin monomer;

b) up to 90 weight-% relative to a combined elastomer contents a)+b) of at least one elastomer selected from the group consisting of a diene elastomer and a copolymer of a conjugated diene and an aromatic vinyl compound;

c) 0.5 to 20 parts by weight relative to 100 parts by weight of the combined elastomer contents a)+b) of at least one phenolic component selected from the group consisting of a phenolic resin and a precursor mixture, wherein the precursor mixture consists of at least one phenol and at least one aldehyde and wherein the phenolic resin is prepared by polycondensation from the precursor mixture; and d) 40 to 100 parts by weight relative to 100 parts by weight of the combined elastomer contents a)+b) of a reinforcing agent selected from the group consisting of finely divided silica and a finely divided silica/carbon black mixture.

* * * * *